(12) United States Patent
Wu

(10) Patent No.: US 9,690,055 B2
(45) Date of Patent: Jun. 27, 2017

(54) LASER-BASED SYSTEMS AND METHODS FOR FIBER-TO-FERRULE BONDING FOR OPTICAL FIBER CONNECTORS

(71) Applicant: CORNING OPTICAL COMMUNICATIONS LLC, Hickory, NC (US)

(72) Inventor: Qi Wu, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 249 days.

(21) Appl. No.: 14/303,933

(22) Filed: Jun. 13, 2014

(65) Prior Publication Data

US 2015/0362679 A1    Dec. 17, 2015

(51) Int. Cl.
| | |
|---|---|
| *B32B 37/12* | (2006.01) |
| *G02B 6/38* | (2006.01) |
| *B32B 37/14* | (2006.01) |
| *B32B 38/00* | (2006.01) |

(52) U.S. Cl.
CPC ........ *G02B 6/3861* (2013.01); *B32B 37/1292* (2013.01); *B32B 37/142* (2013.01); *B32B 38/0008* (2013.01); *B32B 2037/1253* (2013.01); *B32B 2307/412* (2013.01); *B32B 2551/00* (2013.01)

(58) Field of Classification Search
CPC . B32B 37/1292; B32B 37/142; B32B 38/008; G02B 6/3861
See application file for complete search history.

(56) References Cited

U.S. PATENT DOCUMENTS

| | | | | |
|---|---|---|---|---|
| 4,681,398 | A | * 7/1987 | Bailey | G02B 6/245 385/79 |
| 4,896,938 | A | 1/1990 | Mathis et al. | 350/96.21 |
| 4,994,134 | A | 2/1991 | Knecht et al. | 156/294 |
| 5,058,984 | A | * 10/1991 | Bulman | G02B 6/3887 385/80 |
| 5,680,493 | A | * 10/1997 | Naitoh | G02B 6/4204 385/38 |

(Continued)

FOREIGN PATENT DOCUMENTS

| | | |
|---|---|---|
| EP | 0374939 A2 | 6/1990 |
| JP | 6223009 A | 1/1987 |

(Continued)

OTHER PUBLICATIONS

Machine translation of Satake JP62-23009 publslihed on Jan. 31, 1987.*

(Continued)

*Primary Examiner* — Daniel McNally
(74) *Attorney, Agent, or Firm* — Adam R. Weeks

(57) ABSTRACT

Systems and methods for bonding a bare fiber section within a longitudinal bore of a ferrule are disclosed. The methods include inserting the bare fiber section into the ferrule bore along with a photoactivated adhesive. A diverging beam of activating light is directed into an endface of the bare fiber section at the ferrule front end. The activating light passes through the bare fiber section to expose the surrounding photoactivated adhesive, thereby bonding the bare fiber section within the longitudinal bore. The ferrule and fiber can then be incorporated into an optical fiber connector.

19 Claims, 7 Drawing Sheets

(56) References Cited

U.S. PATENT DOCUMENTS

| | | | | |
|---|---|---|---|---|
| 5,772,720 | A * | 6/1998 | Taira-Griffin | C03B 37/15 264/1.26 |
| 6,478,452 | B1 * | 11/2002 | Richardson | H01S 5/005 235/454 |
| 6,491,444 | B1 * | 12/2002 | Greub | C09J 167/06 385/80 |
| 7,022,382 | B1 * | 4/2006 | Khudyakov | C03C 25/6233 118/620 |
| 7,264,403 | B1 * | 9/2007 | Danley | G02B 6/3863 385/53 |
| 2004/0131311 | A1 * | 7/2004 | Sergey | G02B 6/4206 385/33 |

FOREIGN PATENT DOCUMENTS

| | | | |
|---|---|---|---|
| JP | 62023009 A | * | 1/1987 |
| JP | 63204204 A | | 8/1988 |

OTHER PUBLICATIONS

Corning Cable Systems LLC, Anaerobic Connector Consumables Gray Lapping Film, Specification Sheet Revision Date Mar. 19, 2012, 2 pages.
FOC 82 Proceedings, Rapid Field Termination of an SMA Fiber Optic Connector, Ron Schultz, Sep. 15-17, 1982, 8 pages.
UV-Curable Adhesive Bonds Optical Fiber to Connector, Design News, Dec. 6, 1982, 2 pages.
Patent Cooperation Treaty International Search Report, Application No. PCT/US2015/034797, Dec. 11, 2015, 4 pages.

* cited by examiner

LASER-BASED SYSTEMS AND METHODS FOR FIBER-TO-FERRULE BONDING FOR OPTICAL FIBER CONNECTORS

TECHNICAL FIELD

The present disclosure relates to optical fiber connectors, and in particular relates to laser-based systems and methods for bonding an optical fiber to a ferrule for use in an optical fiber connector.

BACKGROUND

Optical fiber connectors have been the fundamental building block of fiber connectivity since the invention of optical fibers more than four decades ago. Almost every type of optical-fiber-based telecommunication system requires the use of one or more types of optical fiber connectors to establish optical connections between different sections of optical fiber and/or between optical fibers and the various optical devices and components of the telecommunication system.

Standard physical-contact optical fiber connectors for telecommunication applications are made by stripping an optical-fiber section to the exposed bare glass. This bare fiber section is then inserted into a longitudinal bore of a cylindrical ceramic ferrule. The bare fiber section is typically bonded to the ferrule within the longitudinal bore using an adhesive. The bare fiber section that extends from the longitudinal bore at the front end of the ferrule is then cleaved (if not cleaved prior to insertion) and polished, and in some cases may extend slightly past the ferrule front end.

These process steps take time, require a relatively high level of skill and expertise, and add considerable cost to the manufacturing of conventional optical fiber connectors. The processes can also be difficult to implement in the field, where it is inconvenient to use large tools and complicated process steps.

There is thus a need for low-cost and simple methods for making optical fiber connectors, especially for field installations.

SUMMARY

An aspect of the disclosure is a method of securing a bare fiber section within a longitudinal bore of a ferrule having a front end. The method includes: disposing the bare fiber section in the longitudinal bore, the bare fiber section having an endface and the longitudinal bore having a length and an inner wall; introducing a photoactivated adhesive into the longitudinal bore, wherein the photoactivated adhesive occupies at least a portion of a region within the longitudinal bore defined by the inner wall of the longitudinal bore and the bare fiber section disposed therein, and further wherein the photoactivated adhesive is activated when exposed to an activating light; and focusing the activating light at a focus position in front of the front end of the ferrule to form a diverging beam of the activating light that enters the endface of the bare fiber section, wherein the activating light passes out of the bare fiber section in the longitudinal bore and exposes the photoactivated adhesive.

Another aspect of the disclosure is a method of bonding an optical fiber in a ferrule having opposite front and back ends and a longitudinal bore having an inner wall and a length. The method includes: providing a photoactivated adhesive within the longitudinal bore, wherein the photoactivated adhesive has an activating wavelength; inserting a bare fiber section of the optical fiber into the longitudinal bore of the ferrule from the back end to the front end, wherein the photoactive adhesive substantially occupies an annular cylindrical region defined by the inner wall of the longitudinal bore and an outer surface of the bare fiber section; and causing activating light that includes the activating wavelength to pass through the bare fiber section and expose the photoactive adhesive over substantially the entire length of the longitudinal bore to bond the bare fiber section within the longitudinal bore.

Another aspect of the disclosure is a system for bonding optical components. The system includes: a light source configured to emit light; a focusing optical system configured to direct the light along an optical path; a ferrule having a longitudinal bore and opposite front and back ends; a reference optical system arranged in the optical path downstream of the focusing optical system and disposed adjacent the front end of the ferrule. The system also includes: an optical fiber having a bare fiber section disposed in the longitudinal bore of the ferrule; and a photoactivated adhesive residing in a region defined by an outer surface of the bare fiber section and an inner wall of the longitudinal bore. The focusing optical system is configured to focus the light at a focus position so that diverging activating light can be formed downstream of the focus position. The reference optical system is arranged downstream of the focus position and configured to direct the diverging activating light through an endface of the bare fiber section. The bare fiber section is configured to allow the diverging activating light to pass through the bare fiber section and expose the photoactivated adhesive. The photoactivated adhesive is configured to be activated when exposed to the diverging activating light.

Another aspect of the disclosure is a method of bonding a bare section of optical fiber within a longitudinal bore of a ferrule for an optical fiber connector. The method includes: inserting the bare fiber section into the ferrule bore along with a photoactivated adhesive; directing a diverging beam of activating light into an endface of the bare fiber section at a ferrule front end; and passing the activating light through the bare fiber section to expose the surrounding photoactivated adhesive, thereby bonding the bare fiber section within the longitudinal bore.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s) and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure. Additionally, Cartesian coordinates are shown in some of the drawings for the sake of reference and are not intended to be limiting as to direction or orientation.

In general, the drawings and description below relate to methods of bonding one or more optical fibers to a ferrule. In the discussion below, the word "bond" is used herein in connection with the ferrule and a bare fiber section to mean fix, secure, attach, or otherwise hold the bare fiber section within a bore of the ferrule. The phrase "fiber-to-ferrule bonding" is a shorthand, non-limiting way of referring to the various methods disclosed herein.

The methods disclosed herein may be part of a cable assembly process for a fiber-optic cable. That is, the methods may be part of terminating one or more optical fibers from a fiber-optic cable with an optical connector to form a fiber-optic-cable assembly, and the termination may be done in a factory or in the field.

Optical Fiber Connector

Figure 1:
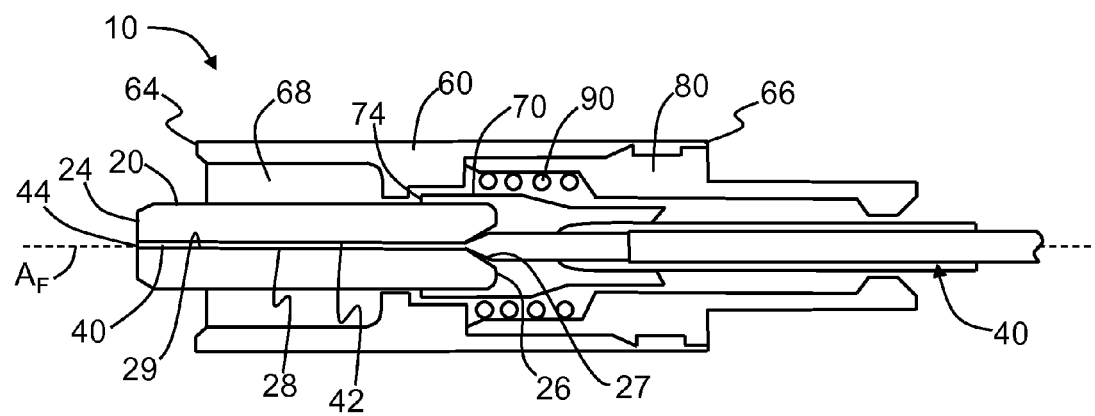
FIG. 1 is a cross-sectional view of an example optical fiber connector for which the fiber-to-ferrule bonding methods disclosed herein can be used.

FIG. 1 is a cross-sectional view of an example optical fiber connector ("connector") 10 that operably supports a ferrule 20. Although connector 10 is shown in the form of a SC-type connector, the methods described herein may be applicable to processes involving different connector and/or ferrule designs. This includes ST-, LC-, FC-, MU-, MT- and MTP-style connectors, for example, and other single-fiber or multi-fiber connectors and ferrules. A general overview of connector 10 will be provided simply to facilitate discussion.

Figure 2A:
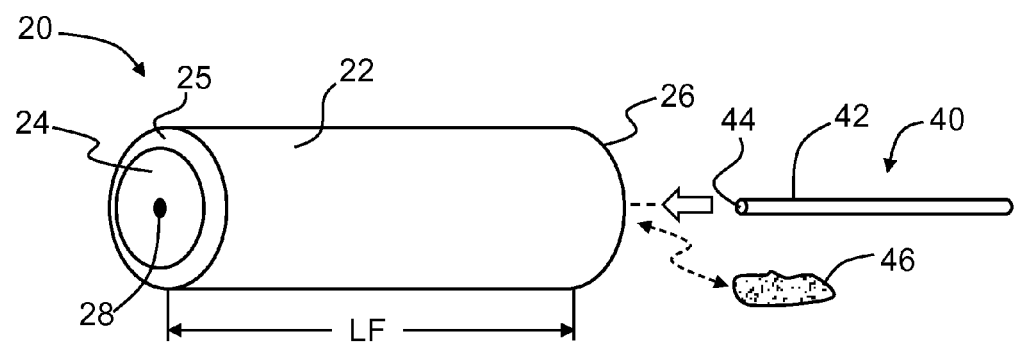
FIGS. 2A through 2C are front elevated views of an example ferrule, along with a bare fiber section of an optical fiber.
Figure 2B:
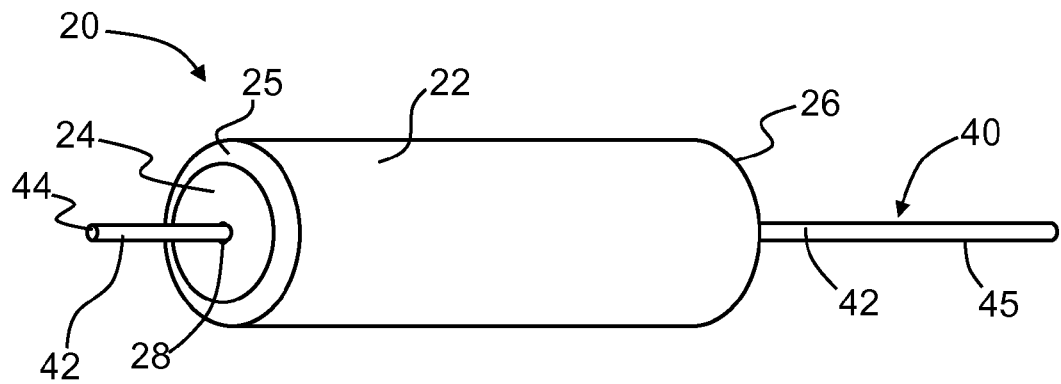
Figure 2C:
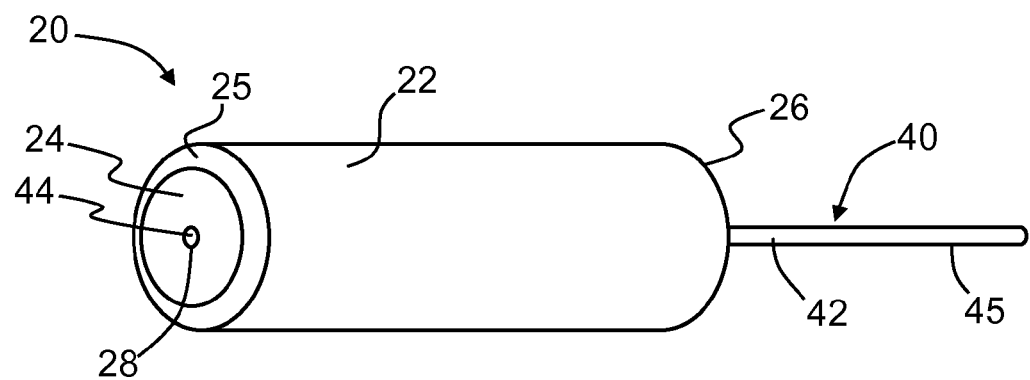
Figure 3A:
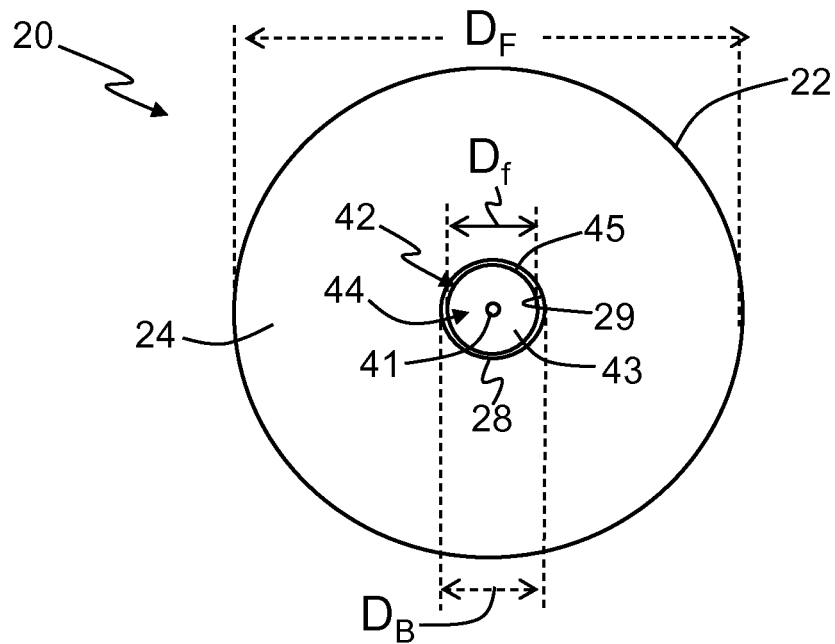
FIG. 3A is a close-up front-end view of the ferrule and bare fiber section of FIG. 2C, showing the various dimensions of the ferrule, the bare fiber section, and the longitudinal bore.
Figure 3B:
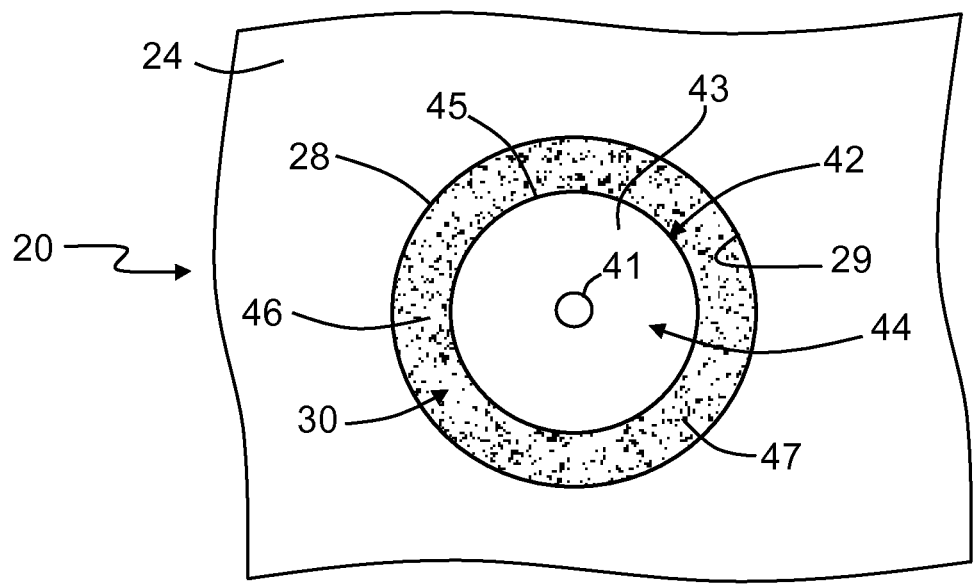
FIG. 3B is similar to FIG. 3A but is a more detailed close-up view that shows the photoactivated adhesive disposed in an annular cylindrical region defined by an inner wall of the longitudinal bore and an outer surface of the bare fiber section.

The connector 10 includes ferrule 20. FIGS. 2A through 2C are front elevated views of ferrule 20. FIGS. 3A and 3B are front-end views of ferrule 20, which includes an outer surface 22, a front end 24, a back end 26, and a longitudinal bore 28. The longitudinal bore 28 is defined by an inner wall 29 (see FIG. 3B) and is nominally centered on the true center of ferrule 20, i.e., to within a manufacturing tolerance, e.g., 1 μm. In an example, back end 27 includes an angled counterbore 27 centered on longitudinal bore 26.

The connector 10 also includes an optical fiber 40, which in an example is a tight-buffered optical fiber. An end portion of optical fiber 40 is stripped down to the glass to form a bare fiber section 42. The bare fiber section 42 has a front end (or "endface") 44 and an outer surface 45. The bare fiber section 42 is inserted into and then fixed (bonded) within longitudinal bore 28 of ferrule 20, as shown in FIGS. 2A through 2C and as discussed in greater detail below. In an example, longitudinal bore 28 is centered on a ferrule central axis $A_F$ to within a select tolerance.

With reference again to FIG. 1, connector 10 also includes an enclosure 60 (or "housing" or "body") having a front end 64, a back end 66 and an interior 68. A ferrule holder 70 resides within interior 68 of enclosure 60. The ferrule holder 70 has an open front end 74 that holds back end 26 of ferrule 20 so that front end 24 of the ferrule extends beyond enclosure front end 64. The ferrule holder 70 is supported within a lead-in tube 80 that engages enclosure 60 at back end 66 and that extends into enclosure interior 68. A spring 90 resides in enclosure interior 88 and surrounds a portion of ferrule holder 70.

Variations of these aspects will be appreciated by persons skilled in the design of optical fiber connectors. Again, connector 10 is merely an example to facilitate discussion of methods of bonding an optical fiber to a ferrule, although aspects of the methods include incorporating the ferrule and optical fiber bonded thereto into an optical connector.

Ferrule and Bare Fiber Section

The longitudinal bore 28 is sized to accommodate bare fiber section 42 and may include the aforementioned angled counterbore 27 to facilitate inserting bare fiber section 42 into the longitudinal bore. Once bare fiber section 42 has been inserted into longitudinal bore 28 and positioned, front end 44 either resides at ferrule front end 24 (i.e., is substantially flush therewith, i.e., is co-planar with front end 44 to within 2 microns) or protrudes a short distance therefrom. This distance is called the protrusion distance and is denoted $d_s$ (see FIG. 6, introduced and discussed below). In an example, front end 44 of bare fiber section 42 is formed by selective cleaving of the bare fiber section using conventional cleaving means. This cleaving can be performed prior to or after bare fiber section 42 is inserted into longitudinal bore 28.

The ferrule 20 has an axial length LF, which in one example is 5 mm and in another example is 10 mm, so that example axial lengths LF of longitudinal bore 28 are also 5 mm or 10 mm. When ferrule 20 includes counterbore 27, the length of longitudinal bore 28 is slightly less than the length of the ferrule. In an example, ferrule 20 is made of a ceramic, e.g., a zirconia ceramic. In an example, ferrule front end 24 is flat, while in another example the ferrule front end has a convex curvature.

With reference to FIG. 3A, ferrule 20 has an outside diameter $D_F$ while longitudinal bore 28 has a diameter $D_B$ and bare fiber section 42 has a diameter $D_f$. In an example, $D_F$=2.5 mm or 1.25 mm and $D_B$=126 μm, while bare fiber section 42 has a diameter $D_f$=125 μm. In the example shown, ferrule 20 includes a beveled section 25 at front end 24 adjacent outer surface 22 that transitions from the diameter of the front end to the diameter of the outer surface.

As shown in FIG. 3B, a photoactivated adhesive 46 occupies at least a portion of an annular cylindrical region 30 defined between inner wall 29 of longitudinal bore 28 and outer surface 45 of bare fiber section 42. In an example, photoactivated adhesive 46 substantially occupies annular cylindrical region 30, while in another example it completely occupies the annular cylindrical region. Additionally, photoactivated adhesive 46 may occupy angled counterbore 27 (if present) in these and other examples.

The photoactivated adhesive 46 is used to hold (bond) bare fiber section 42 within longitudinal bore 28, as described below. In FIG. 3B, the relative dimensions of bare fiber section 42 and longitudinal bore 28 are not to scale for ease of illustration and to more clearly show annular cylindrical region 30 and photoactivated adhesive 46 therein. FIGS. 3A and 3B also show bare fiber section 42 as having a central core 41 surrounded by a cladding 43. The photoactivated adhesive 46 has a front-end portion 47 that generally coincides with ferrule front end 24.

With reference again to FIGS. 2A through 2C, bare fiber section 42 is inserted into longitudinal bore 28 at back end 26 of ferrule 20. The photoactivated adhesive 46 also needs to be introduced into longitudinal bore 28. This can be accomplished in a number of ways. In one example, photoactivated adhesive 46 can be applied to bare fiber section 42 prior to insertion. In another example, photoactivated adhesive 46 can be inserted (e.g., injected) into longitudinal bore 28 subsequent to or prior to the insertion of bare fiber section 42. In another example, bare fiber section 42 can be dipped into photoactivated adhesive 46 and then inserted into longitudinal bore 28. In yet another example, photoactivated adhesive 46 can be introduced into longitudinal bore 28 by passing the longitudinal bore through a drop of photoactivated adhesive disposed at back end 26 of ferrule 20 at the longitudinal bore. Thus, in some aspects of the method, bare fiber section 42 picks up photoactive adhesive 46 and carries it into longitudinal bore 28 during the process being inserted into the longitudinal bore at the ferrule back end 26. This approach can be facilitated by the use of the aforementioned counterbore 27, which can be used to support the drop of photoactivated adhesive 46.

In an example, bare fiber section 42 is cleaved (e.g., by a laser, such as a $CO_2$ laser, or by a mechanical cleaver) before being inserted into longitudinal bore 28 of ferrule 20. This aspect of the method can be implemented in factory settings prior to deployment in the field.

In another example, the cleaved bare fiber section 42 undergoes a heat treatment, such as electric arc heating or laser heating, to strengthen outer surface 45 before being inserted into longitudinal bore 28 of ferrule 20.

The photoactivated adhesive 46 is designed to solidify upon exposure to a sufficient amount of electromagnetic radiation having a photoactivating wavelength $\lambda_{PA}$. Such electromagnetic radiation is referred to hereinafter as "activating light." Thus, once bare fiber section 42 is inserted into longitudinal bore 28 along with photoactivated adhesive 46, the photoactivated adhesive needs to be exposed to the activating light to solidify. Examples of photoactivated adhesive 46 suitable for use in carrying out the methods disclosed herein include NOA85V, NOA86 and NOA87, available from Norland Products, Inc., Cranbury, N.J. In an example, photoactivated adhesive 46 is substantially index-matched to core 41 of optical fiber 40.

In recent years, manufacturers of photoactivated adhesives have extended the photoactivating wavelength $\lambda_{PA}$ into the visible range by incorporating photoinitiators that fragment to reactive species upon illumination by visible light. These photoactivated adhesives enable the use of laser light sources, such as LEDs, that emit light at about 400 nm. The LED light sources are more energy efficient than conventional mercury lamps, which typically consume 100 W of power and operate at ultraviolet wavelengths.

Exposure Optical System

Figure 4:
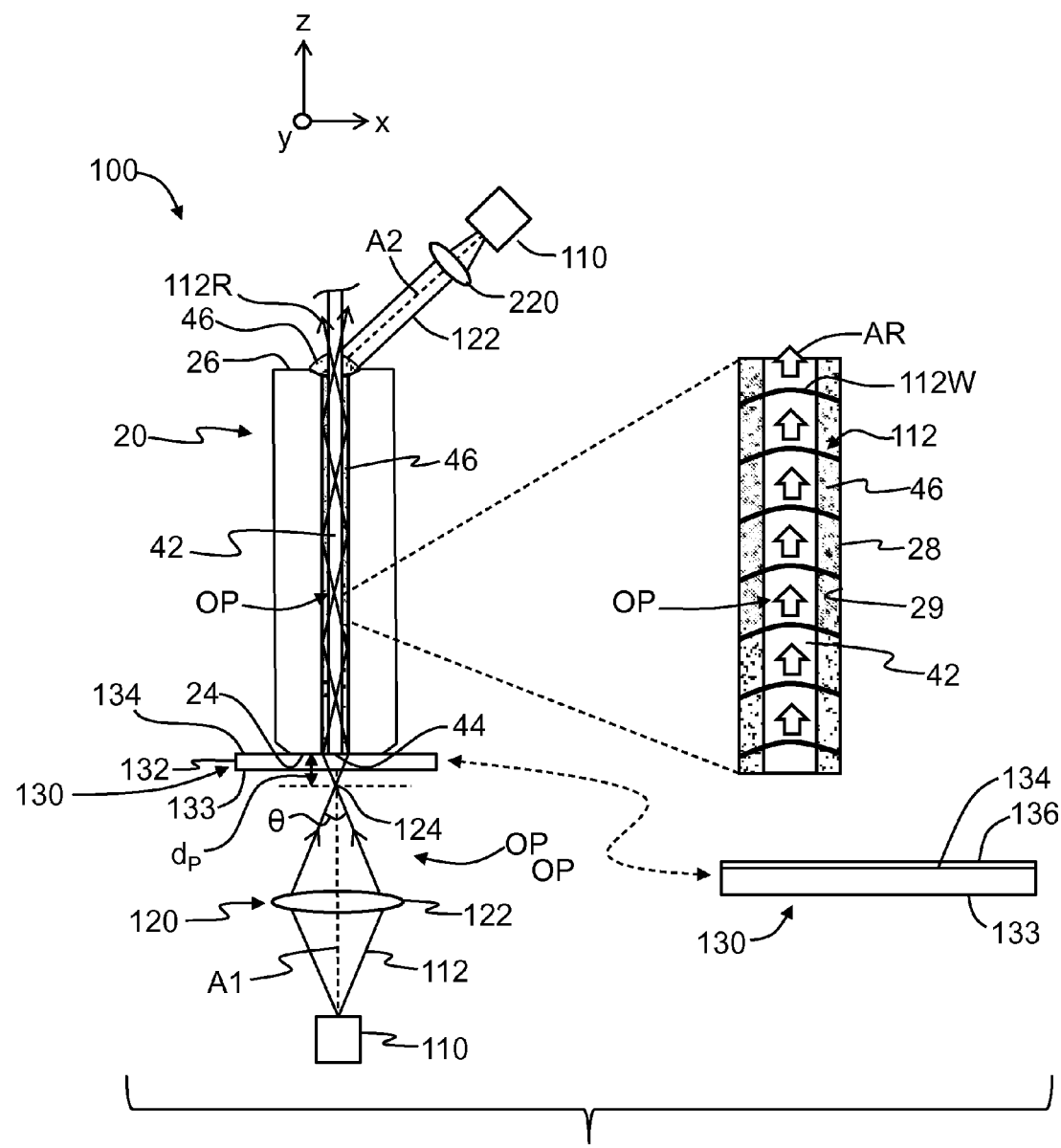
FIG. 4 is a schematic diagram of an example system used to perform the fiber-to-ferrule bonding methods disclose herein.

FIG. 4 is a schematic diagram of an example exposure optical system 100 used to carry out the fiber-to-ferrule bonding methods wherein photoactivated adhesive 46 is photoactivated to secure bare fiber section 42 within longitudinal bore 28. The exposure optical system 100 includes along an optical axis A1 (which runs in the z-direction) a light source 110 that emits activating light 112, i.e., light that includes the photoactivating wavelength $\lambda_{PA}$. In an example, light source 110 includes or consists of a 405-nm blue-violet diode laser, which is widely used in Blu-Ray Disc™ players. Such diode lasers operate in single mode and thus emit a Gaussian beam having excellent beam quality.

The light source 110 can also include a UV or visible-wavelength diode laser or light-emitting diode. Generally speaking, light source 110 can be any light source that emits activating light 112 and that is compact enough to be used in the field. In this regard, laser light sources, and especially diode lasers and compact semiconductor-based lasers, are eminently suitable for use as light source 110. In an example, light source 110 includes a diode laser that emits activating light 112 having a wavelength range from 200 nm to 600 nm.

The exposure optical system 100 also includes a focusing optical system 120 that includes one or more optical elements 122 configured to receive activating light 112 from light source 110 and focus the activating light at a focus position 124 on optical axis A1 at a convergence angle θ. The convergence angle θ defines an output-side numerical aperture (NA) of focusing optical system 120. The optical elements 122 can include lenses, mirrors, apertures, gratings, fibers, beamsplitters, filters, attenuators, etc. In an example, the one or more optical elements 122 consist of a single refractive element, such as an aspheric lens element. The focus position 124 is axially spaced apart from ferrule front end 24 by a distance $d_P$. In an example, distance $d_P$ is between 0.5 mm and 5 mm, with about 1 mm being a convenient distance. In an example, one or more of the optical elements 122 of focusing optical system 120 are movable (e.g., axially movable) to adjust at least one of focus position 124 and convergence angle θ.

The exposure optical system 100 further includes a reference optical system 130 arranged between focus position 124 and front end 24 of ferrule 20, i.e., the reference optical system is arranged downstream of the focus position and upstream of the ferrule. The reference optical system 130 includes one or more optical elements 132 and is substantially transparent to the photoactivating wavelength $\lambda_{PA}$. In an example embodiment, reference optical system 130 includes a single optical element 132. The reference optical system 130 includes a front optical surface 133 that faces focus position 124 and a back optical surface 134 that faces ferrule front end 24.

In one example, back optical surface 134 is planar, while in another example it is curved, e.g., has a concave curvature that matches the optional convex curvature of ferrule front end 24. In an example, the concave curvature has a radius of 25 mm. In one example, back optical surface 134 is in contact with ferrule front end 24, as shown in FIG. 4. In another example shown and discussed below in connection with FIG. 6 (introduced and discussed below), back optical surface 134 is spaced apart from ferrule front end 24 by a spacer 270 that defines the aforementioned protrusion distance $d_s$.

In an example, reference optical system 130 includes a single element 132 in the form of a planar glass substrate that in one example is made of a chemically strengthened glass that is strong and scratch resistant. An example of such a glass is Corning Gorilla® glass, which is formed by an ion-exchange process.

In an example where back optical surface 134 is in contact with ferrule front end 24, the back optical surface can include a "non-stick" coating 136 that does not substantially bond with photoactivated adhesive 46 (see lower close-up inset of FIG. 4). Example materials for coating 136 include TEFLON® and fluorosilane.

Fiber-to-Ferrule Bonding

In the operation of exposure optical system 100, light source 110 emits activating light 112. This light 112 is received by focusing optical system 120 and is focused thereby to converge at focus position 124. The activating light 112 diverges from focus position 124 at the same angle as the convergence angle θ and then passes through reference optical system 130. This light 112 then enters front end 44 of optical fiber 40, as well as front-end portion 47 of photoactivated adhesive 46 that as noted above substantially occupies annular cylindrical region 30. Exposure optical system 100 thus defines an optical path OP for activating light 112 from light source 110 to photoactivated adhesive 46. A portion of optical path OP resides within longitudinal bore 28 and bare fiber section 42 therein.

It is noted here that when a single-mode light source 110 is used, activating light 112 defines a relatively uniform beam. The convergence/divergence angle θ of activating beam 112 is selected so that the activating light floods longitudinal bore 28. The activating light 112 passes through (i.e., out of) bare fiber section 42 and exposes photoactivated adhesive 46 substantially along the length of longitudinal bore 28, thereby activating the photoactivated adhesive and securing the bare fiber section within the longitudinal bore.

In an example, this securing or bonding process takes place over the entire length of longitudinal bore 28. In another example, the securing or bonding process takes place over less than the entire length of longitudinal bore 28, e.g., over at least 80% of the entire length.

The exposure process is illustrated in FIG. 4 in one example by light rays 112R in the main portion of the Figure and by wavefronts 112W in the upper close-up inset. The arrows AR in the upper close-up inset indicate the direction of propagation of wavefronts 112W of activating light 112. Some of the activating light 112 that is not absorbed by photoactivated adhesive 46 reflects from longitudinal bore inner wall 29, as illustrated by activating light rays 112R.

Simulations of the above-described exposure process based on an example configuration of exposure optical system 100 were performed. The example configuration included reference optical system 130 consisting of a single planar transparent element (e.g., a substrate) 132 having an axial thickness of 0.5 mm. Further, the focal position distance $d_p=1$ mm, the longitudinal bore diameter $D_B=0.126$ mm, the ferrule length LF=5 mm and light source 110 was taken as a blue-UV diode laser that emits (single-mode, Gaussian) activating light 112 at an activating wavelength $\lambda_{FP}=405$ mm. The simulations did not take into account multiple reflections from longitudinal bore inner wall 29. Such reflections actually increase the exposure uniformity.

Figure 5:
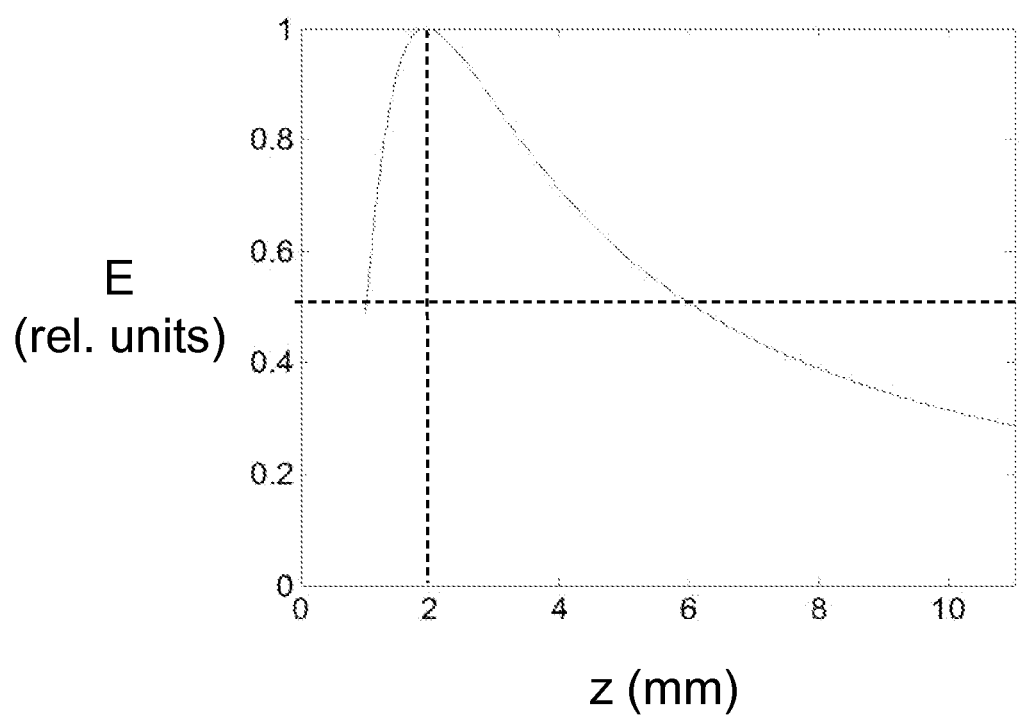
FIG. 5 is a plot of exposure E (relative units) versus axial distance z (mm) of activating light as the activating light travels through the optical fiber and the photoactivated adhesive.

FIG. 5 is a plot of the exposure E (relative units) versus the axial distance z (mm) of activating light 112 as it travels in the z-direction while exposing photoactivated adhesive 46. The horizontal line shows the (0.5)·E level, or 50% exposure uniformity. The plot of FIG. 5 is based on the simulations performed on the example configuration for exposure optical system 100 and ferrule 20.

The simulations performed for this example configuration indicate that the optimized divergence angle θ of activating light 112 (taken at the $1/e^2$ intensity of the Gaussian beam) is 45.4 milliradians (mrad). The intensity of activating light 112 varies by less than 50% within the first 5 mm length of ferrule 20. Also, there is enough activating light 112 to activate photoactivated adhesive 46 beyond 5 mm. Because the peak exposure can exceed the required (minimum) exposure by a large amount (e.g., by a factor of 2 to 3), a large variation in the exposure can still activate photoactivated adhesive 46.

In general, a convergence/divergence angle θ that is too large reduces the total amount of optical power coupling into bare fiber section 42, while too small of a convergence/divergence angle θ provides insufficient intensity at ferrule front end 24. Consequently, a substantially optimized divergence angle θ, e.g., one that is within +/−10% of the optimized divergence angle, is recommended.

To further homogenize the intensity of activating light 112 as it travels down bare fiber section 42 and through photoactivated adhesive 46, focusing optical system 120 may be configured to provide an intensity for the activating light that has substantially optimum uniformity over the range of convergence/divergence angles θ. This can include the use of uniformizing optical elements 122, such as homogenizers, filters, etc.

Also, in an example wherein light source 110 has different divergence angles in orthogonal directions (e.g., emits an elliptical beam), focusing optical system 120 can be configured to re-shape the emitted beam to be circularly symmetric. This can be done, for example, through the use of one or more cylindrical or anamorphic optical elements 122.

A suitable convergence/divergence angle θ for performing the fiber-to-ferrule bonding methods with exposure optical system 100 can be obtained with simple optics in a compact package or footprint. For instance, if light source 110 includes a diode laser with a divergence angle of 15°, then focusing optical system 120 can consist of a single aspheric optical (lens) element 122 having a focal length of 4.5 mm to form a convergence/divergence angle θ=45.5 mrad. The distance from this single lens element 122 to focus position 124 is only 30 mm. This allows for exposure optical system 100 to be very compact, e.g., about the size of a laser pointer or a hand-held device.

In an example embodiment illustrated in FIG. 4, exposure optical system 100 optionally includes a second light source 110 and a beam-conditioning optical system 220 arranged along a second optical axis A2 that intersects optical axis A1 at back end 26 of ferrule 20. A drop of photoactivated adhesive 46 is disposed at ferrule back end 26 (e.g., within counterbore 27) where bare fiber section 42 extends from longitudinal bore 28.

The activating light 112 from second light source 110 is directed by beam-conditioning optical system 220 to expose and solidify the drop of photoactivated adhesive 46. This provides improved strain relief for bare fiber section 42 at back end 26 of ferrule 20. In an example, beam-conditioning optical system 220 forms a collimated beam of activating light 112 that defines a spot size at the drop of photoactivated adhesive 46 of about 1 mm in diameter. In an alternative embodiment, activating light 112 from first light source 110 that exits ferrule back end 26 is used to expose and solidify the island of photoactivated adhesive 46.

In an example, once bare fiber section 42 is bonded within longitudinal bore 28, endface 44 of the bare fiber section can be processed. This processing can include polishing using conventional means, such as a conventional one-step touch-up polishing, laser polishing, mechanical polishing, etc.

The use of photoactivated adhesive 46 in the fiber-to-ferrule bonding methods disclosed herein offers a number of advantages. For example, photoactivated adhesives contain no solvents and allow time for proper positioning of bare fiber section 42. When bare fiber section 42 is properly positioned, the photoactivation can be performed rapidly, i.e., in seconds. By comparison, anaerobic adhesives require a primer, and the curing time is too short to allow for position adjustments. Also, heat-cured adhesives take longer to cure and introduce stress due to the elevated temperatures needed for curing.

Exposure Optical System with Enclosure

Figure 6:
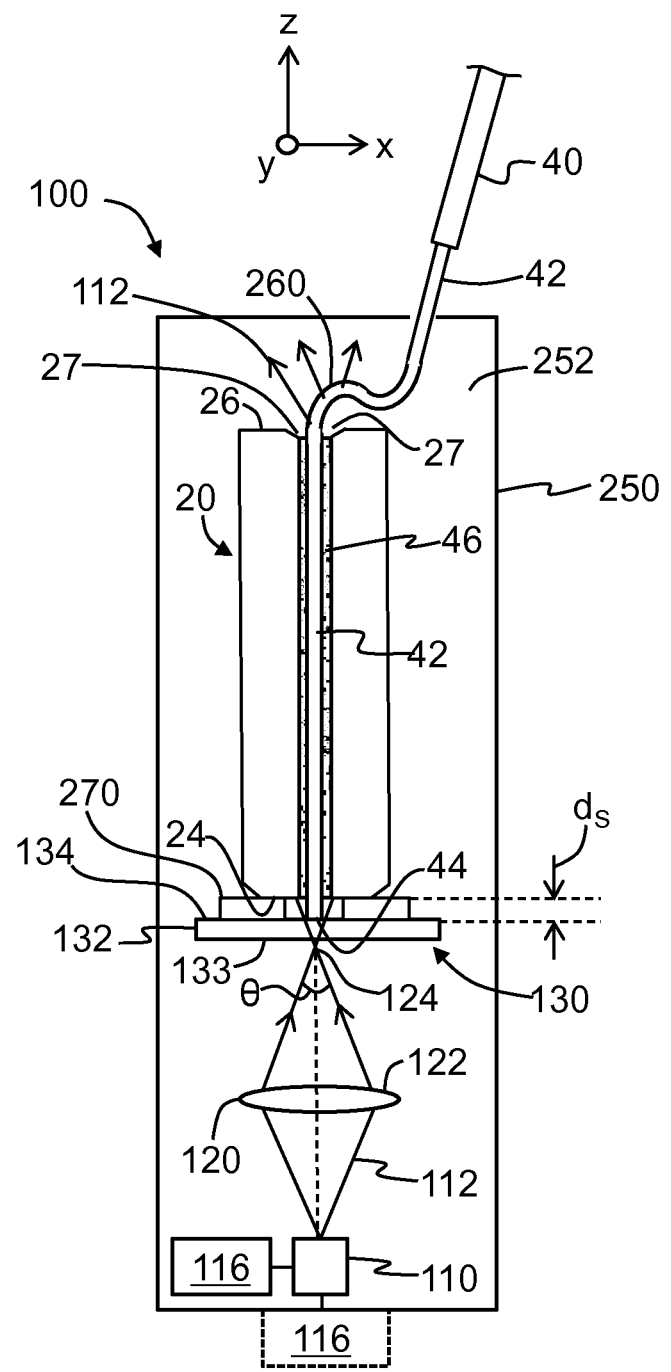
FIG. 6 is similar to FIG. 4 and illustrates an example exposure optical system that includes an enclosure that keeps most of the activating light within the enclosure interior, and also shows an embodiment that utilizes a spacer to define a protrusion distance of the bare fiber section relative to the ferrule front end.

FIG. 6 is similar to FIG. 4 and illustrates an example exposure optical system 100 that includes an enclosure 250 having an interior 252 that includes some or all of the components of the exposure optical system. An advantage of this configuration is that enclosure 250 can be used to contain stray activating light 112 during the exposure process.

In the exposure process, the majority of activating light 112 is coupled to cladding 43 of bare fiber section 42 and exits the cladding to expose the surrounding photoactivated adhesive 46. Less than 1% of the optical power of activating light 112 is coupled into central core 41 of bare fiber section 42. Accordingly, substantially all activating light 112 traveling within bare fiber section 42 beyond ferrule back end 26 can be removed by forming a strong bend 260 in bare fiber section 42 (or optical fiber 40), as illustrated in FIG. 6. In an example, enclosure interior 250 is configured to accommodate bend 260 so that activating light 112 that leaves the bare fiber section 42 at the bend remains within the enclosure interior. In another example, the jacket of optical fiber 40 prevents any activating light 112 traveling in the fiber from escaping, and therefore bend 260 need not be accommodated.

In an example, system 100 includes a power supply 116 electrically connected to light source 110. In one example, power supply 116 resides in enclosure 250 (as shown) while in another example it resides adjacent the enclosure as illustrated by the dashed-line box. In an example, power supply 116 includes one or more batteries suitable for powering light source 110.

For a longitudinal bore length LF=10 mm, and assuming 50% of the power from light source 110 is utilized, it takes only about five seconds with 55 mW of power provided by activating light 112 to achieve the required photoactivation energy density of 3.5 J/cm². This is well within the range of diode lasers used for Blu-Ray Disc™ players. The power consumption of such lasers is more than two orders of magnitudes more efficient than that of mercury lamps, thereby allowing for battery operation and thus a compact system.

Exposure Optical System with Spacer

In the example exposure optical system 100 shown in FIG. 6, spacer 270 having an axial thickness $d_s$ is operably disposed between back optical surface 134 of reference optical system 130 and ferrule front end 24. This configuration can be used to allow bare fiber section 42 to protrude from ferrule front end 24 by the aforementioned protrusion distance $d_s$, which in the present case is defined by spacer thickness $d_s$. In an example, the protrusion distance $d_s$ can be in the range from 5 µm to 15 µm, with 10 µm being a convenient target protrusion distance.

The protruding portion of bare fiber section 42, which may be covered with unactivated photoactivated adhesive 46, can be processed once the bare fiber section is bonded within longitudinal bore 28. In an example, this processing includes polishing using conventional means, such as a conventional one-step touch-up polishing, laser polishing, laser cleaving, mechanical cleaving, etc.

Index-Matching

Figure 7A:
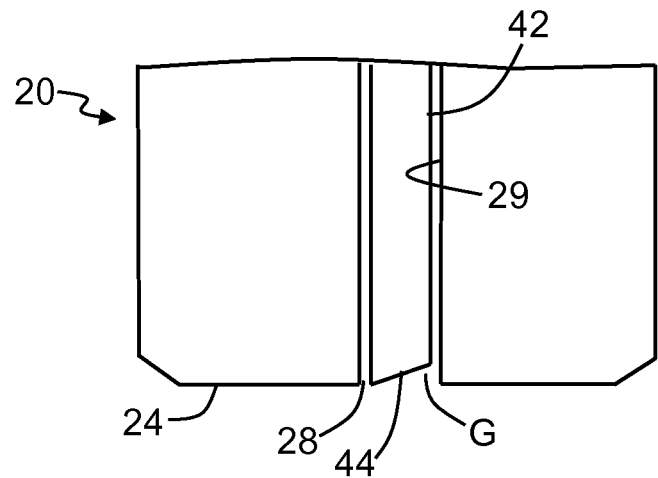
FIGS. 7A and 7B are close-up cross-sectional views of the ferrule front end and the bare fiber section showing an example of a cleaving mismatch (FIG. 7A) and showing an aspect of the method wherein the cleaving mismatch is fixed using an index-matching photoactivated adhesive (FIG. 7B).

FIG. 7A is a close-up cross-sectional view of front end 24 of ferrule 20 and bare fiber section 42 that illustrates an example wherein endface 44 is not matched to the ferrule front end. This mismatch can occur for example due to the cleaving process. FIG. 7A shows a gap G formed by the endface mismatch.

Figure 7B:
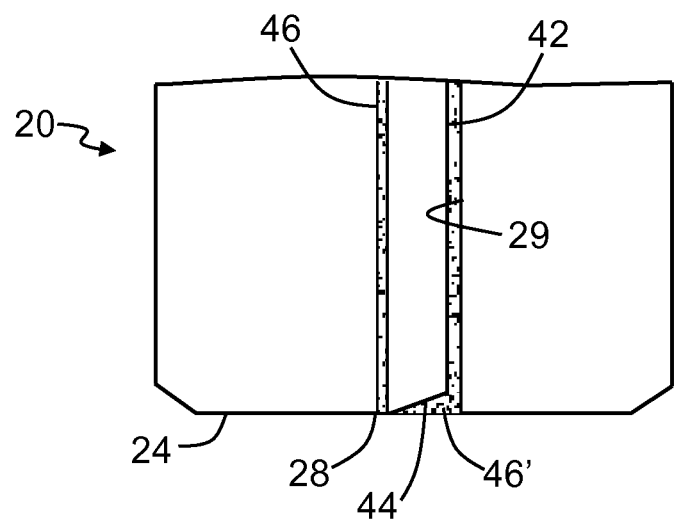

With reference to FIG. 7B, gap G is filled with photoactivated adhesive 46' that is index-matched to bare fiber section 42 (and to central core 41 in particular). This allows connector 10 formed using ferrule 20 and bare fiber section 42 of FIG. 7B to maintain good physical contact with another connector and have a low insertion loss and a high return loss. This aspect of the methods disclosed herein removes sensitivity to the cleaving process. A related aspect of the disclosure applies this method to angle-polished connectors, wherein the index of photoactive adhesive 46' need not be matched to that of bare fiber section 42.

An advantage of the methods disclosed herein is that they can work with standard factor connector parts, which are low cost and well developed. The methods do not require any modifications to the ferrules or other parts of the connector body. The photoactivated adhesive can be optimized for both index matching and high bond strength.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of securing a bare fiber section within a longitudinal bore of a ferrule having a front end and a back end, wherein the ferrule comprises a ceramic material, and wherein at least a portion of the front end of the ferrule is spaced apart from a back optical surface of a reference optical system by a distance $d_s$ in the range 5 µm≤$d_s$≤15 µm, the method comprising:

inserting the bare fiber section into the longitudinal bore of the ferrule from the back end to the front end until an endface of the bare fiber section contacts the back optical surface of the reference optical system such that the bare fiber section protrudes from the front end of the ferrule by the distance $d_s$, the longitudinal bore having a length and an inner wall;

introducing a photoactivated adhesive into the longitudinal bore, wherein the photoactivated adhesive occupies at least a portion of a region within the longitudinal bore defined by the inner wall of the longitudinal bore and the bare fiber section disposed therein, and further wherein the photoactivated adhesive is activated when exposed to an activating light; and focusing the activating light at a focus position in front of the front end of the ferrule to form a diverging beam of the activating light that passes through the reference optical system and enters the endface of the bare fiber section while the bare fiber section remains protruding from the front end of the ferrule by the distance $d_s$, wherein the activating light passes out of the bare fiber section in the longitudinal bore and exposes the photoactivated adhesive to bond the bare fiber section to the ceramic material of the ferrule;

wherein the activating light is generated by a diode laser with an operating wavelength in the range from 200 nm to 600 nm.

2. The method according to claim 1, wherein focusing the activating light at the focus position includes passing the activating light through a focusing optical system.

3. The method according to claim 2, wherein the focusing optical system consists of a single aspheric refractive lens element.

4. The method according to claim 1, further comprising: incorporating the ferrule and optical fiber bonded therein into an optical fiber connector.

5. The method according to claim 1, wherein:
the photoactive adhesive substantially occupies the annular cylindrical region defined by the inner wall of the longitudinal bore and the outer surface of the bare fiber section; and
the activating light that passes out of the bare fiber section in the longitudinal bore exposes the photoactive adhesive over substantially the entire length of the longitudinal bore to bond the bare fiber section within the longitudinal bore.

6. The method according to claim 1, wherein introducing the photoactivated adhesive into the longitudinal bore includes at least one of:
a) dipping the bare fiber section into the photoactivated adhesive and then inserting the bare fiber section and photoactivated adhesive into the longitudinal bore;
b) injecting the photoactivated adhesive into the longitudinal bore; and
c) passing the bare fiber section through a drop of photoactivated adhesive disposed at the back end of the ferrule at the longitudinal bore.

7. The method according to claim 1, wherein the optical fiber has a core and the photoactivated adhesive is index-matched to the core.

8. The method according to claim 1, further comprising: processing the endface of the bare fiber section after the bonding of the bare fiber section within the longitudinal bore.

9. The method according to claim 1, wherein the focus position is located at a distance $d_p$ from the front end of the ferrule, and wherein 0.5 mm≤$d_p$≤5 mm.

10. The method according to claim 1, wherein the back optical surface includes a coating that does not substantially bond to the photoactivated adhesive.

11. The method according to claim 1, wherein the ceramic material of the ferrule comprises zirconia, and wherein the activating light is generated by a visible-wavelength diode laser.

12. A method of bonding a bare section of optical fiber within a longitudinal bore of a ferrule for an optical fiber connector, wherein the ferrule comprises a ceramic material, and wherein at least a portion of a front end of the ferrule is spaced apart from a back optical surface of a reference optical system by a distance $d_s$ in the range 5 μm≤$d_s$≤15 μm, the method comprising:

inserting the bare fiber section into the ferrule bore until an endface of the bare fiber section contacts the back optical surface of the reference optical system such that the bare fiber section protrudes from the front end of the ferrule by the distance $d_s$;

introducing a photoactivated adhesive into the ferrule bore, wherein the photoactivated adhesive occupies at least a portion of an annular cylindrical region defined between an inner wall of the ferrule bore and an outer surface of bare fiber section;

directing a diverging beam of activating light through the reference optical system and into the endface of the bare fiber section while the bare fiber section remains protruding from the front end of the ferrule by the distance $d_s$, wherein the activating light originates from a diode laser that emits light at a wavelength in the range from 200 nm to 600 nm; and passing the activating light through the bare fiber section to expose the photoactivated adhesive that occupies at least a portion of the annular cylindrical region, thereby bonding the bare fiber section to the ceramic material of the ferrule within the longitudinal bore.

13. The method according to claim 12, further including incorporating the ferrule and the bare fiber section into an optical fiber connector.

14. The method according to claim 12, wherein introducing the photoactivated adhesive into the ferrule bore includes at least one of:
a) dipping the bare fiber section into the photoactivated adhesive and then inserting the bare fiber section and photoactivated adhesive into the longitudinal bore;
b) injecting the photoactivated adhesive into the longitudinal bore; and
c) passing the bare fiber section through a drop of photoactivated adhesive disposed at a back end of the ferrule at the longitudinal bore.

15. The method according to claim 12, further comprising forming the diverging activating light by focusing activating light to a focus position upstream of the endface of the bare fiber section.

16. The method according to claim 12, wherein the ceramic material of the ferrule comprises zirconia, and wherein the activating light is generated by a visible-wavelength diode laser.

17. The method according to claim 12, wherein:
the ferrule bore is nominally centered on a true center of ferrule;
the bare fiber section has a diameter of 125 μm; and
the diverging beam of activating light has a divergence angle that is within +/−10% of 45.4 milliradians.

18. A method of securing a bare fiber section within a longitudinal bore of a ferrule having a front end and a back end, wherein at least a portion of the front end of the ferrule is spaced apart from a back optical surface of a reference optical system by a distance $d_s$ in the range 5 μm≤$d_s$≤15 μm, the method comprising:

inserting the bare fiber section into the longitudinal bore of the ferrule from the back end to the front end until an endface of the bare fiber section contacts the back optical surface of the reference optical system such that the bare fiber section protrudes from the front end of the ferrule by the distance $d_s$, the longitudinal bore having a length and an inner wall;

introducing a photoactivated adhesive into the longitudinal bore, wherein the photoactivated adhesive occupies at least a portion of a region within the longitudinal bore defined by the inner wall of the longitudinal bore and the bare fiber section disposed therein, and further wherein the photoactivated adhesive is activated when exposed to an activating light; and focusing the activating light at a focus position in front of the front end of the ferrule to form a diverging beam of the activating light that passes through the reference optical system and enters the endface of the bare fiber section while the bare fiber section remains protruding from the front end of the ferrule by the distance $d_s$, wherein the activating light passes out of the bare fiber section in the longitudinal bore and exposes the photoactivated adhesive to bond the bare fiber section to the ferrule.

19. The method according to claim 18, further comprising:

cleaving the bare fiber section before inserting the bare fiber section into the longitudinal bore of the ferrule.

\* \* \* \* \*